(12) United States Patent  (10) Patent No.: US 9,165,039 B2
Odom  (45) Date of Patent: Oct. 20, 2015

(54) METHODS AND SYSTEMS FOR PROVIDING PERSONALIZED CONTEXTUAL SEARCH RESULTS

(75) Inventor: Paul S. Odom, Houston, TX (US)

(73) Assignee: KANG JO MGMT, LIMITED LIABILITY COMPANY, Wilmington, DE (US)

( * ) Notice: Subject to any disclaimer, the term of this patent is extended or adjusted under 35 U.S.C. 154(b) by 663 days.

(21) Appl. No.: 11/605,479

(22) Filed: Nov. 29, 2006

(65) Prior Publication Data

US 2007/0260598 A1  Nov. 8, 2007

Related U.S. Application Data

(60) Provisional application No. 60/740,281, filed on Nov. 29, 2005.

(51) Int. Cl.
*G06F 17/30* (2006.01)

(52) U.S. Cl.
CPC .... *G06F 17/30528* (2013.01); *G06F 17/30648* (2013.01)

(58) Field of Classification Search
CPC ................................ G06F 17/30; G06F 17/00
USPC ........... 707/3, 6, 102, 4, 5, 999.004, 999.003, 707/999.007, E17.009, E17.108, 600–899; 715/230; 705/4
See application file for complete search history.

(56) References Cited

U.S. PATENT DOCUMENTS

| | | |
|---|---|---|
| 4,580,218 A | 4/1986 | Raye |
| 5,265,065 A | 11/1993 | Turtle |
| 5,278,980 A | 1/1994 | Pedersen et al. |
| 5,490,061 A | 2/1996 | Tolin et al. |
| 5,625,748 A | 4/1997 | McDonough et al. |
| 5,745,776 A | 4/1998 | Sheppard, II |
| 5,842,206 A | 11/1998 | Sotomayor |
| 5,924,105 A | 7/1999 | Punch, III et al. |
| 5,937,422 A | 8/1999 | Nelson et al. |
| 5,940,821 A | 8/1999 | Wical |
| 5,960,385 A | 9/1999 | Skiena et al. |
| 5,987,454 A | 11/1999 | Hobbs |

(Continued)

OTHER PUBLICATIONS

"Autonomy Server: Product Brief." 2 pgs. Accessed Feb. 22, 2002. (http://www.autonomy.com/perl/Register.perl?doc=/autonomy_v3/Media/Collaterals/Product_Briefs/PB_Autonomy/Server_02.01.pdf).

(Continued)

*Primary Examiner* — Isaac M Woo (57) ABSTRACT

The present invention provides search engine methods and systems for generating highly personalized and relevant search results based on the context of a user's search constraint and user characteristics. In an embodiment, upon receipt of a user's search constraint, the method determines all semantic variations for each word within the user search constraint. Additionally, topics can be determined within the user constraint. For each unique word and topic within the user search constraint, possible contexts are determined. A matrix of feasible context scenarios is established. Each context scenario is ranked to determine the most likely context scenario for which the user search constraint relates based on user characteristics. In one embodiment, the weighting used to rank the contexts is based on previous user searches and/or knowledge of their interests. Search results associated with the highest ranking context are provided to the user, along with topics associated with lower ranked contexts.

17 Claims, 2 Drawing Sheets

(56) References Cited

U.S. PATENT DOCUMENTS

| | | | |
|---|---|---|---|
| 5,987,460 A * | 11/1999 | Niwa et al. ............................ 1/1 | |
| 6,038,560 A | 3/2000 | Wical | |
| 6,070,133 A | 5/2000 | Brewster et al. | |
| 6,085,187 A | 7/2000 | Carter et al. | |
| 6,115,718 A | 9/2000 | Huberman et al. | |
| 6,125,362 A | 9/2000 | Elworthy | |
| 6,212,532 B1 | 4/2001 | Johnson et al. | |
| 6,226,792 B1 | 5/2001 | Goiffon et al. | |
| 6,233,575 B1 | 5/2001 | Agrawal et al. | |
| 6,236,958 B1 | 5/2001 | Lange et al. | |
| 6,363,374 B1 * | 3/2002 | Corston-Oliver et al. ........... 1/1 | |
| 6,363,378 B1 | 3/2002 | Conklin et al. | |
| 6,421,675 B1 | 7/2002 | Ryan et al. | |
| 6,446,061 B1 | 9/2002 | Doerre et al. | |
| 6,460,034 B1 | 10/2002 | Wical | |
| 6,473,730 B1 | 10/2002 | McKeown et al. | |
| 6,505,151 B1 | 1/2003 | Chou et al. | |
| 6,529,902 B1 | 3/2003 | Kanevsky et al. | |
| 6,556,987 B1 | 4/2003 | Brown et al. | |
| 6,594,654 B1 | 7/2003 | Salam et al. | |
| 6,606,659 B1 | 8/2003 | Hegli et al. | |
| 6,665,661 B1 | 12/2003 | Crow et al. | |
| 6,678,694 B1 * | 1/2004 | Zimmermann et al. ....... 707/731 | |
| 6,708,162 B1 * | 3/2004 | Morgan et al. ......................... 1/1 | |
| 6,751,611 B2 | 6/2004 | Krupin et al. | |
| 6,772,170 B2 | 8/2004 | Pennock et al. | |
| 6,775,677 B1 | 8/2004 | Ando et al. | |
| 6,941,513 B2 | 9/2005 | Meystel et al. | |
| 7,003,513 B2 * | 2/2006 | Geiselhart ............................ 1/1 | |
| 7,113,943 B2 | 9/2006 | Bradford et al. | |
| 7,219,105 B2 * | 5/2007 | Kummamuru et al. .............. 1/1 | |
| 7,251,600 B2 | 7/2007 | Ju et al. | |
| 7,286,978 B2 | 10/2007 | Huang et al. | |
| 7,305,415 B2 | 12/2007 | Vernau et al. | |
| 7,321,850 B2 | 1/2008 | Wakita | |
| 7,340,466 B2 | 3/2008 | Odom et al. | |
| 7,496,567 B1 | 2/2009 | Steichen | |
| 7,548,910 B1 * | 6/2009 | Chu et al. ............................ 1/1 | |
| 7,613,690 B2 | 11/2009 | Chowdhury et al. | |
| 2002/0046018 A1 | 4/2002 | Marcu et al. | |
| 2002/0099700 A1 * | 7/2002 | Li ..................................... 707/5 | |
| 2002/0099730 A1 | 7/2002 | Brown et al. | |
| 2002/0103788 A1 * | 8/2002 | Donaldson et al. ................ 707/3 | |
| 2002/0103799 A1 | 8/2002 | Bradford et al. | |
| 2002/0123994 A1 * | 9/2002 | Schabes et al. .................... 707/5 | |
| 2003/0018659 A1 * | 1/2003 | Fuks et al. ..................... 707/500 | |
| 2003/0097375 A1 | 5/2003 | Pennock et al. | |
| 2003/0154071 A1 | 8/2003 | Shreve | |
| 2003/0212669 A1 * | 11/2003 | Dedhia et al. ...................... 707/3 | |
| 2003/0220913 A1 * | 11/2003 | Doganata et al. .................. 707/3 | |
| 2004/0024583 A1 | 2/2004 | Freeman | |
| 2004/0024739 A1 | 2/2004 | Copperman et al. | |
| 2004/0024752 A1 * | 2/2004 | Manber et al. ..................... 707/3 | |
| 2004/0049541 A1 | 3/2004 | Swahn | |
| 2004/0093327 A1 | 5/2004 | Anderson et al. | |
| 2004/0128267 A1 | 7/2004 | Berger et al. | |
| 2004/0186828 A1 * | 9/2004 | Yadav et al. ....................... 707/3 | |
| 2004/0199375 A1 | 10/2004 | Ehsani et al. | |
| 2005/0060286 A1 * | 3/2005 | Hansen et al. ..................... 707/2 | |
| 2005/0091211 A1 | 4/2005 | Vernau et al. | |
| 2005/0114198 A1 | 5/2005 | Koningstein et al. | |
| 2005/0131758 A1 | 6/2005 | Desikan et al. | |
| 2005/0154617 A1 * | 7/2005 | Ruggieri et al. ................... 705/4 | |
| 2005/0160082 A1 * | 7/2005 | Dawson ............................. 707/3 | |
| 2005/0165782 A1 * | 7/2005 | Yamamoto ........................ 707/7 | |
| 2005/0171761 A1 | 8/2005 | Ju et al. | |
| 2005/0222987 A1 * | 10/2005 | Vadon ............................... 707/3 | |
| 2005/0240580 A1 | 10/2005 | Zamir et al. | |
| 2006/0004732 A1 * | 1/2006 | Odom ............................... 707/3 | |
| 2006/0026013 A1 | 2/2006 | Kraft | |
| 2006/0129381 A1 | 6/2006 | Wakita | |
| 2006/0167857 A1 * | 7/2006 | Kraft et al. ........................ 707/3 | |
| 2006/0184354 A1 | 8/2006 | Huang et al. | |
| 2007/0038603 A1 * | 2/2007 | Guha ................................ 707/3 | |
| 2007/0038614 A1 * | 2/2007 | Guha ................................ 707/4 | |
| 2007/0078822 A1 | 4/2007 | Cucerzan et al. | |

OTHER PUBLICATIONS

"Autonomy Technology White Paper", 19 pgs. Accessed Feb. 22, 2002. (http://www.autonomy.com/perl/Register.perl?doc=autonomy_v3/Media/Collaterals/Autonomy_White_Papers/Autonomy_Technology_WP_0401.pdf).

"DolphinSearch Proprietary Information", 10 pgs. Accessed Feb. 22, 2002. (http://www.dolphinsearch.com/downloads/dsWhitePaper2001.pdf).

"DolphinSearch Technology Summary", 2 pgs. Accessed Feb. 22, 2002. (http://www.dolphinsearch.com/downloads/Technology_Summary.pdf).

"Verity Intelligent Classification: Turn Information Assets into Competitive Advantage", 13 pgs. Accessed Feb. 22, 2002. (http://www.verity.com/pdf/MK0349_int_class_wp.pdf).

"Verity K2 Architecture: Unprecedented Performance, Scalability and Fault Tolerance", 9 pgs. Accessed Feb. 22, 2002. (http://www.verity.com/pdf/MK0366_K2Arch_WP.pdf).

"Verity Search: The Advantages of Advanced Information Retrieval", 13 pgs. Accessed Feb. 22, 2002. (http://www.verity.com/pdf/MK0348_Search_WP.pdf).

Official Action dated May 29, 2008 issued in U.S. Appl. No. 11/194,766; 8 pages.

Response to Official Action dated May 29, 2008 filed in U.S. Appl. No. 11/194,766; 15 pages filed Aug. 29, 2008.

Official Action dated Nov. 4, 2008 issued in U.S. Appl. No. 11/194,766; 11 pages.

Response to Official Action dated Nov. 4, 2008 filed in U.S. Appl. No. 11/194,766; 17 pages filed Dec. 29, 2008.

Official Action dated Feb. 23, 2009 issued in U.S. Appl. No. 11/194,766; 11 pages.

Extended European Search Report for European Patent Application 05778301.1, dated Mar. 25, 2009.

International Preliminary Report on Patentability for PCT/US05/27406, issued Feb. 6, 2007.

International Preliminary Report on Patentability for PCT/US06/45547, issued Mar. 24, 2009.

International Preliminary Report on Patentability for PCT/US07/05222, issued Sep. 2, 2008.

International Search Report for PCT/US05/27406, mailed Dec. 27, 2006.

International Search Report for PCT/US06/45547 mailed Mar. 24, 2008.

International Search Report for PCT/US07/05222, mailed Feb. 15, 2008.

Non-Final Office Action on U.S. Appl. No. 12/764,792, mailed Oct. 6, 2010.

Final Office Action on U.S. Appl. No. 12/764,792, mailed Apr. 1, 2011.

Final Office Action on U.S. Appl. No. 11/194,766, mailed Sep. 3, 2009.

Non-Final Office Action on U.S. Appl. No. 10/086,026, mailed Jul. 14, 2004.

Non-Final Office Action on U.S. Appl. No. 10/086,026, mailed Jan. 26, 2007.

Non-Final Office Action on U.S. Appl. No. 10/086,026, mailed Nov. 1, 2005.

Non-Final Office Action on U.S. Appl. No. 10/086,026, mailed Mar. 25, 2005.

Non-Final Office Action on U.S. Appl. No. 10/086,026, mailed Jun. 5, 2006.

Non-Final Office Action on U.S. Appl. No. 11/605,479, mailed Mar. 25, 2008.

Non-Final Office Action on U.S. Appl. No. 11/712,557, mailed Mar. 5, 2009.

(56) References Cited

OTHER PUBLICATIONS

Non-Final Office Action on U.S. Appl. No. 11/605,479, mailed Dec. 10, 2008.
Notice of Allowance on U.S. Appl. No. 10/086,026, mailed Oct. 9, 2007.
Notice of Allowance on U.S. Appl. No. 11/712,557, mailed Dec. 31, 2009.
Final Office Action on U.S. Appl. No. 12/764,792, mailed Mar. 29, 2012.
Non-final Office Action on U.S. Appl. No. 12/764,792, mailed Oct. 12, 2011.

* cited by examiner

METHODS AND SYSTEMS FOR PROVIDING PERSONALIZED CONTEXTUAL SEARCH RESULTS

CROSS REFERENCE TO RELATED APPLICATIONS

The present application claims the benefit of priority of U.S. Provisional Patent Application No. 60/740,281, filed Nov. 29, 2005, which is incorporated by reference in its entirety.

BACKGROUND OF THE INVENTION

1. Field of the Invention

The present invention relates to search engines, and more particularly, to search engine methods and systems that provide personalized contextual search results.

2. Background of Invention

The emergence of the Information Age has created a wealth of information that is available electronically. Unfortunately, much of this information is often inaccessible to individuals because they do not know where to look for it, or if they do know where to look the information can not be found efficiently. For example, an individual is working at his desk and his boss requests that he find an electronic copy of a memo that the individual sent last month. The memo contains information that was obtained from a website, which included a spreadsheet that had data extracted from a division report.

The boss would like the individual to send a copy of the email and the references back to him as soon as possible. Also, he would like the individual to check for additional references to see if the conclusions in the memo need to be updated. The boss requires that the project be completed within fifteen minutes. The worker is not disorganized, but as is common, does not have total recall of how the information was gathered or where the email is stored. After thirty minutes, the worker finally finds the email. But, the worker still needs to search for additional information as requested by his boss. The end result is that because no efficient search mechanism existed the worker has missed his boss' deadline.

The above example commonly occurs within the workplace, and involves not just email, but all forms of electronically stored information. Human worker studies show that it is not unusual for some office workers to spend more than 10% of each work day looking for information. The same studies claim that less than half those searches are successful. Databases, data warehouses, document management systems, and file searches are often too difficult or "hit and miss" to be used effectively and efficiently. Corporate enterprises and government organizations have spent billions of dollars to aggregate and integrate information, so it will be more accessible. Of course, an individual can get answers if he is a database or document system expert and if the individual remembers the exact title, the exact phrasing used in the document, or the ever elusive primary key associated with the document of interest. Unfortunately, more common than not, this level of detail is not available to assist in finding the information.

Internet based searches are often times even more frustrating, and less productive. For example, it is not particularly useful when you know that there are approximately 6,120,000 answers to the search criteria you just entered. Furthermore, because website popularity has nothing to do with what might be relevant in the thousands of search results, search results driven by website popularity can often lead to useless results. Meanwhile, at search engine operations facility there is an army of personnel and massive server farms humming away to potentially deliver hundreds of thousands of results to every search query that an individual enters.

Web searching, search advertising, and enterprise searching are not consistently providing acceptable search resolution for the user. The missing ingredient in current search technology is "true relevance". Relevance can only be defined by the user for a specific search. Relevancy has no predictable pattern. No generalized algorithm is going to repeatably produce relevant information, because in the end, any generalization is arbitrary.

What are needed are search methods and systems that can efficiently generate search results that are relevant to the particular user's interest within their context of interest.

SUMMARY OF THE INVENTION

The present invention provides search engine methods and systems for generating highly personalized and relevant search results based on the context of a user's search constraint and user characteristics. In an embodiment, upon receipt of a user's search constraint, the method determines all semantic variations for each word within the user search constraint. Additionally, topics can be determined within the user constraint. An approach for determining topics is disclosed within commonly owned, co-pending, U.S. patent application Ser. No. 10/086,026 titled "Topic Identification and Use Thereof in Information Retrieval Systems", which is incorporated herein in its entirety. For each unique word and topic within the user search constraint, possible contexts are determined. A matrix of feasible context scenarios is established. Each context scenario is then ranked to determine the most likely context scenario for which the user search constraint relates based on user characteristics. In one embodiment, the weighting used to rank the contexts is based on previous user searches and knowledge of their interests. Search results associated with the highest ranking context are provided to the user, along with topics associated with lower ranked contexts. The intelligence related to the user interests is updated based on the selection of a particular search result or topic to continually refine the knowledge base used to rank the relevance of a particular context for a particular user or class of users.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Context Principles

Every word in a set of content has a context. For example, this can be seen in a relational database where every table column that contains words has the context of those words defined by the field associated with that column.

| Field A | Field B | Field C | Field D |
|---------|---------|---------|---------|
| 1.234 | Tom Keller | IBM | 1034 E. Lansing |
| 15.23 | Scott Thomas | Oracle Inc | One Oracle Pl. |

In the above table there are the following words in each context, as follows:

| | |
|---|---|
| Field B Context | Tom, Keller, Scott, Thomas |
| Field C Context | IBM, Oracle, Inc. |
| Field D Context | E., Lansing, One, Oracle, Pl. |

Logical names might be attached to each context. For example, in this case,

| |
|---|
| Personal Names = Field B Context |
| Company Names = Field C Context |
| Street Address = Field D Context |

In general, content and/or data frequently contain tagged or labeled information that differentiates one part of the content from another. For example, To, From, Subject, Title, Author, References, Personal Names, Company Names, Building Names, etc. are examples of typical content differentiation that occurs through labeling or tagging. This tagged or labeled content represents different contexts.

Generalization of Context.

All content is not tagged. As in the previous example there are certain classes of phrases and keywords that infer context. People's names, company names, and locations are a few of many examples of keywords or phrases that are capable of being recognized as a specific context independently of having a tag. But these are usually a small percentage of the content. The balance of the words and phrases can be said to have a context that is defined by the subject domain in which they exist within each paragraph/section of the content.

Concept of "Generic Context" Words or Phrases.

Some words like people's names are recognized specifically as names. For example Bill, Robert, George would be immediately recognized as having the context of "name" and more specifically "a person's name". IBM would be recognized as a company name. The White House would be recognized as a government building. Houston, Tex. would be recognized as a location in the United States. Words and phrases that have relatively few possible contexts are said to be "generic context words or phrases". While there are many millions of these, the list is finite.

Concept of Subject Domain.

For the purposes of our discussion, we will assume that it is the intent of every paragraph or section of content to have a subject. Paragraphs or sections that do not relate to a subject or do not contain some context reference such as a label, tag, or generic context words or phrases will, for our purposes, be deemed to be irrelevant. The subject of a paragraph or section is defined by the keywords (i.e. significant words) and the topics (i.e. statistically significant phrases) contained within the content.

Stop Words.

What are typically called stop words (e.g. the, of, and, etc.) generally appear in many contexts. In fact this is the intrinsic nature of stop words. They do very little to differentiate the content's subject domain.

Context Theory

Under context theory there is a strong relationship between the context in which words are used and the subject matter area being discussed. In structured data this is obvious because each data item is assigned a field. The field is the context in which that data is understood. However, in general content the information is not tagged. Within the present invention, subject matter can be used to define context and, that in doing so, the resulting defined contexts can be treated in the same way as data found within well defined fields. A given keyword or topic can have a subject context and a generic context.

For example, a paragraph discussing George Bush and the 2005 budget would suggest that the words George and Bush have a context of person's name and have a context of 2005 budget. The concept of how context can play a role in defining relevancy can be shown by the following simple example. If the search constraint entered was "bush budget", then the context of person's name and 2005 budget would be a possible interpretation if there are interests in government or economic. Or for the landscaping business it might be the budget for bushes for a particular customer. The context choices are obvious and the searcher's work, hobbies, or interest patterns could dictate the context choice. But in this case it is likely to be one or the other.

The Nature of Subject Matter.

The key to developing the relationship between context and subject matter is in defining the correct scope for the subject matter. Conceptually, subject matter can be thought of as being hierarchical. A very broad subject area (e.g. sports) could contain sub areas (e.g. basketball, baseball, etc.) which in turn could contain still further sub areas (e.g. high school, college, professional, etc.) and so on.

In the examples we could have easily changed the hierarchical order to college→sports→basketball and have still been understood by an independent third party. It is clear from this simple example that in order to understand the data found in the lowest category, you must understand every category in the tree above that category.

Ontology.

The following structure, assumptions, and rules define the nature of the content relationships for the proposed management of context relationships. Subject matter has different granularities which we will call "Subject domains."

Super Subject Domain contains

Subject Domains contains

Sub-Domains which contain still more

Sub-Domains and so on

Any subject domain can be defined by unique distribution of topics and keywords. Subject domains defined by the same distributions of topics and keywords are the same subject domain. Note that a distribution of topics and keywords does not need to have a predefined subject domain. The distribution could be statistically derived. Also, note that the concept of subject domain and category though similar are not the same. Categories are predefined and their granularity frequently does not reflect the natural breaks found in the content subject matter.

Keyword/Topic distributions are related to context based on their granularity. This ontology is the basis for the generalization of the present invention methodology and the foundation of the context theory upon which the present invention builds upon.

Relationship between Subject Matter and Context.

Context is defined by subject matter and/or generic context which are present in the content at a certain level of granularity. In the above example basketball is the most granular subject between sports, college, and basketball. Either sports or college could be the least granular. If I choose to query on "arena" then sports is roughly the same granularity. If the query is "academic scholarship" then college could be the correct level of granularity. Or if the query is "field goal percentage" then basketball is the correct level of granularity. It is proposed that part of the context relevancy of "sports", "college", and "basketball" is dynamically defined by the granularity of the search query.

Subject Matter, Topic, and Keyword Granularity.

Subject matter, topics, or keywords can have scopes that range from very general to extremely specific. The determination of the scope granularity can be made by determining the frequency in which entities (keywords, topics) appeared within proximity of the entity of interest.

A list of associated keywords and/or topics can be constructed for each keyword or topic. The more keywords and/or topics that a given keyword or topic is associated with, the more general the keyword or topic (lower granularity). Note that topic associations would typically be more reliable measures of granularity. Granularity ranges can be generated by any number of methods (e.g. natural statistical breaks in the data, fixed percentages, etc.) and used to associate the appropriate subject domain granularity with that of search constraint. Knowing the granularity of a given subject domain provides enough information to define the subject domain as a specific context relative to the search constraint entered by the user. Thus, a statistical relationship has been formed between subject domains and contexts.

Given that a subject domain can be represented by a distribution of keywords and topics and that the correct level of granularity can be determined by the above analysis, then each keyword and topic can be related to a finite set of contexts (like structured data fields).

This procedure has now reduced the potential ambiguity of a given keyword or topic significantly by restricting context matches to the appropriate subject domain granularity.

Subject Matter to Context Conceptual Equivalence.

Any given word or phrase can be determined to be in a finite number of subject matter domains. Words or phrases that are in a large number of subject domains can be considered to be "stop words/phrases". Topics and keywords have a statistical association with subject matter. There is a distribution of topics and keywords that uniquely represent a particular subject matter domain. The more granular the subject matter domain the more tightly defined the distribution of topics and keywords.

Context Matrix Methodology with Personalization

| Context Basis. | |
| --- | --- |
| Axiom: | In a search there is one and only one set of word/topic context assignments that will produce a set of results appropriate and relevant to the intent of the searcher. |
| Requirement: | A set of appropriate valid results exist for the user's query constraint |

| Context Basis. | |
| --- | --- |
| Requirement: | Every word in the search constraint exists in the content in some semantically equivalent form |
| Axiom: | Every word that exists in the content has one or more contexts in which it is found |
| Axiom: | Individual users have patterns in their thought process that produce patterns in the context of the words that they use in their search constraint. |

Identification of context within content and analysis of the patterns of context usage by the user can lead to much higher search precision and recall. This methodology potentially changes the inverse relationship between precision and recall to a proportional relationship. That means that as recall increases precision will also increase when the context analysis is implemented.

| Personalization Principles | |
| --- | --- |
| Axiom: | There is a repetition in a searcher's thought patterns as expressed through the contexts of the words used in the search constraint. |

There are at least four characteristics of context usage that can be used to judge the searcher's intent. These are:

1. The order in which the context of the search constraint words/topics appear.

2. The contexts that are used when searching in certain subject areas.

3. The frequency in which the collective contexts are used.

4. The frequency of topic contexts and the words that compose them based on item 3 above.

The use of these principles allows the present invention to understand how the searcher thinks when he constructs a search string. Obviously, these mathematical representations could be applied to the general population as opposed to an individual. Or, these could be applied to groups of individuals such as pre-teen, teenagers, young adults, the human resources group within an enterprise, real estate agents, etc. Anyone of these groups, once developed, could be the starting point for personalization of the individual belonging to that group.

Local Search Embodiments

The methodology can be applied to many types of search problems. For ease of illustration the methodology is applied below to a local search problem. In local search, we will assign all data of interest to one of eight contexts. This is a convenient number. In other examples, more or less contexts could be used. These contexts are:

1. N—Business Name
2. L—Location (e.g. street name, city, metro area, zip code)
3. P—Generic Products sold or bought by the business
4. S—Services provided by the business
5. B—Specific Brands sold or traded by the business
6. C—Business Category (i.e. NAICS)
7. T—Telephone Number
8. W—Website URL Method Setup 1. Derive a list of all words found in each context
2. Compile all stems, abbreviations, and synonyms for all the words as available
3. Determine topics and unique words and categorize them by context The tools and/or logic available for the search method are as follows:
1. Search to determine feasibility for context configurations
2. Context of the words used in the search constraint
3. Semantics of the words used in the search constraint
4. Phrase recognition in the search constraint
5. Feasibility of a specific search using criteria identified 1 through 4 above (i.e. producing at least one result)
6. Relative location of the results from a specific search using criteria identified in 1 through 4
7. Search user tendencies in entering context words into the search constraint
    α—The order in which the user(s) typically enters contexts (i.e. words in a specific context) in the search constraint
    β—Based on Business Category (C) the set of contexts typically used by the user(s) in the entered search constraint
    γ—The relative frequency of usage of each context in search constraints entered by the user(s)
    Δ—Phrases by context by γ
    Any other pattern derived from data mining the user searches and choice of results
    Mathematical Surface.

The surface is defined by the number of words in the search constraint and the number of contexts that contain each word. For the purposes of this analysis we will arbitrarily limit the number of words in the search constraint to $1 \leq n_w \leq 5$ where $n_w$=number of words in the constraint Example of search constraint context construct where the user has entered 3 search words into the constraint:

| Search Constraint Words | Context [X = Word present in the context] | | | | | | |
|---|---|---|---|---|---|---|---|
| | N | L | P | S | B | C | T | W |
| Word$_1$ | X | X | | | | | | |
| Word$_2$ | X | | | X | | | | |
| Word$_3$ | | | X | | | X | | |

Note:
Single column labels (N, L, P, S, etc.) are defined above in the 8 contexts.

The above context constraint generates 9 possible cases as shown below. Note that in this example all cases are always logically feasible. This will not always be the situation.

| Case Number | Word$_1$ | Word$_2$ | Word$_3$ | Logically Feasible |
|---|---|---|---|---|
| 1 | N | N | P | T |
| 2 | N | N | C | T |
| 3 | N | S | P | T |
| 4 | N | S | C | T |
| 5 | L | N | P | T |
| 6 | L | N | C | T |
| 7 | L | S | P | T |
| 9 | L | S | C | T |

The methodology dictates that one and only one of these cases will produce the most relevant set of results when a context constrained search is done. The chosen case would be based on feasibility (i.e. logically feasible and the search will produce results), relative location (i.e. the results are close to the user's current location, for example, when searching for a local business), and the personal tendencies of the user.

In another example, additional contexts and tools and/or logic available for the search method are as listed below. In this example, the contexts include:
N—Business Name
L—Location (e.g. street name, city, metro area, zip code)
P—Generic Products sold or bought by the business
S—Services provided by the business
B—Specific Brands sold or traded by the business
C—Business Category (i.e. NAICS)
T—Telephone Number
W—Website URL
H—Representative Phrase (e.g. 24, 24/7, Sat, Sun, Mon for time that business is open)
A—Acceptable Payment Method (e.g. Visa, MC, AMEX, Cash, Check)

In this example, the tools and/or logic available for the search method are as follows:
1. Search to determine feasibility of context configurations based on words entered by the user for the required search (i.e. if search is over constrained)
2. Context of each of the words used in the search constraint
3. Semantics of the words used in the search constraint
4. Linguistics of the search constraint (e.g. open 24, takes credit, in Clear Lake area, on Main, within 10 miles, provides tours, takes appointments on Saturday, has product X, near ATM, etc.)
5. Context phrase recognition in the search constraint
6. Feasibility of a specific search using criteria identified 1 through 5 above (i.e. producing at least one result)
7. Determine the logical choices, if any, for context out of the feasible set of contexts
8. Within a reasonable distance (closest gets highest rank, but this by itself does not set the final choice of context)
9. Choose the best scope for search result. Generally choose larger scope.
    a. Business Category vs. Business Name
    b. Product/Service vs. Business Name
    c. Address(location) vs. Business Name
10. Search User Identified by
    a. generic population,
    b. group [e.g. regional, ethnic, by income level, education, professional, etc.]
    c. specific individual
11. tendencies in entering context words into the search constraint
    a. α—The order in which the user(s) typically enters contexts (i.e. words in a specific context) in the search constraint
    b. β—The set of contexts typically used by the user(s) in the entered search constraint based on the potential business categories(C)
    c. γ—The relative frequency of usage of each context in search constraints entered by the user(s)
    d. Δ—Phrases by context by γ

An Example Implementation

The following steps would occur after a user has entered a search constraint (i.e. one or more individual words or character symbols) into the system.
1. A determination is made as to whether any of the words entered have semantic variations (e.g. stems, abbreviations, synonyms, common misspellings).
2. If there are two or more words in the search determine if there are topics present.
3. Define what contexts contain in each of the search constraint words and/or topics. Topics (two or more words in proximity in the search constraint) initially take precedence over individual keywords. Stop words are ignored if they are not part of a topic.
4. Develop a matrix of feasible context cases as shown above.

5. Rank the context cases by the following procedure, if there is more than one feasible context case:
    a. If there are options for how to create topics from the user's constraint, then rank those by using γ.
    b. Use α probability tree (path dependent) to determine the probability of the context sequence entered and order all the case entries by this probability.
    c. If there is a tie or a near tie in item (b), then use γ to break the tie based on the context sequence that has the highest individual context rankings.
    d. Run searches on the candidates within some meaningful distance (e.g. 50 miles) and return the list of business categories found.
    e. Rank the business categories by their frequency from highest to lowest.
    f. For the business categories (e.g. three categories) use β to rate each of the context cases based on which context cases match the context expected for the business category.
    g. The context case(s) with the best match determines which results (from the previous searches) are presented to the user. Also, separately present the topics from all the searches done. If a topic is picked by the searcher, then add that topic to the search result and go to step (b) and repeat the process.
    h. If the user rejects those results, then pick the next most likely context case and present the results to the user.
    i. Provide the user with the ability to confirm the correct result by clicking on it and then augment the existing α β γ data to reflect the context case that was successful. If the user rejects a set of results by clicking on a reject button, then augment α β γ to reflect the context case failure. The changes to α β γ should be weighted so that the changes are reflected gradually over time and not distorted by errors or temporary displacements caused by other users on the owner's system.

Figure 1:
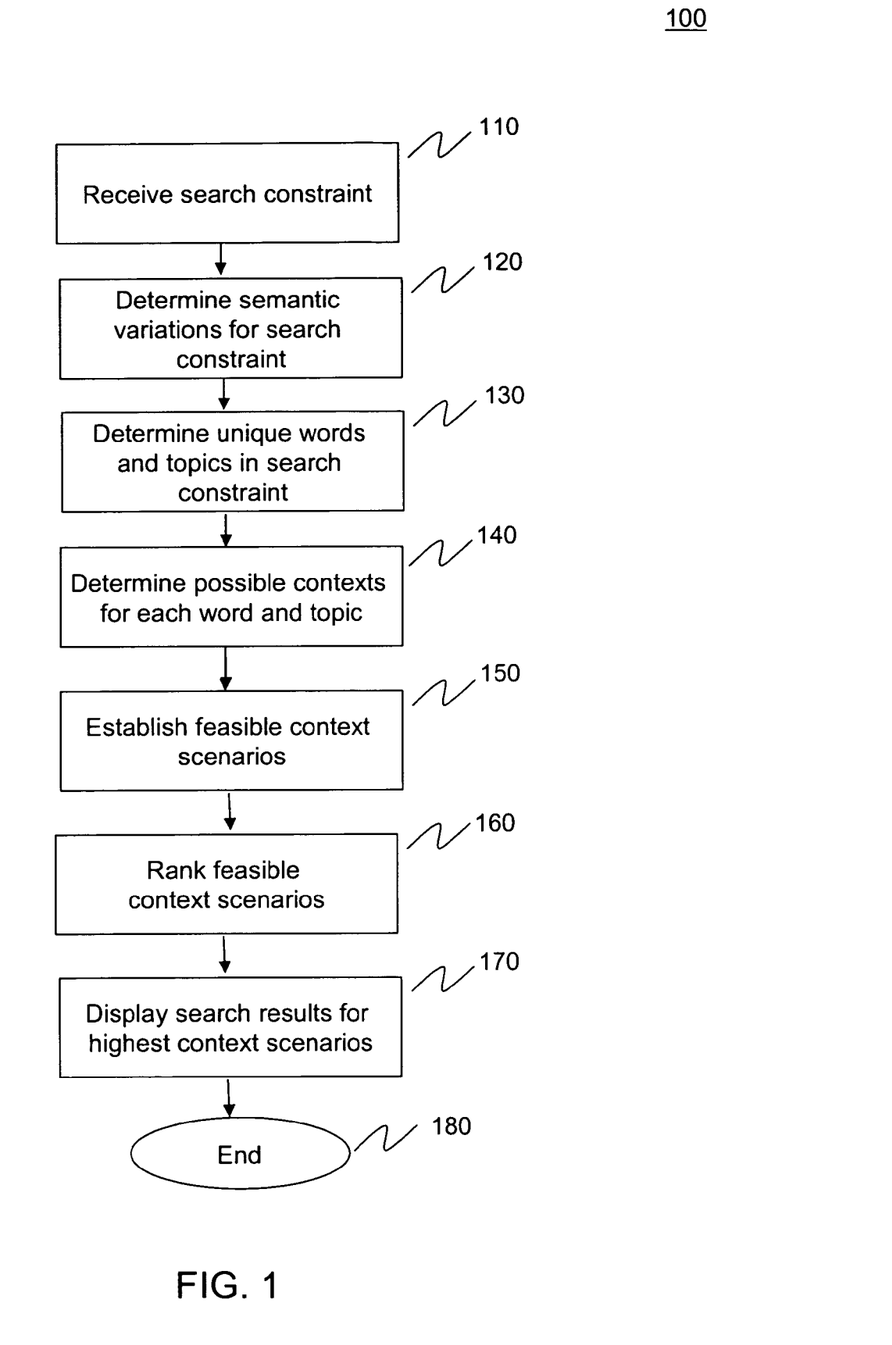
FIG. 1 provides a flowchart of a method for displaying search results according to an embodiment of the invention.

FIG. 1 provides a flowchart of method 100 for displaying search results, according to an embodiment of the invention. Method 100 provides a summary of the above concepts and steps for illustration purposes, and is not intended to limit the scope of the invention. Method 100 begins in step 110.

In step 110 a search constraint in received from a user. In optional step 120 semantic variations for the search constraint are determined. In step 130 unique words contained within the search constraint are determined. In an embodiment stop words are eliminated. In another embodiment, topics within the search constraint are also determined. In step 140 possible contexts for each word and topic are determined. In step 150 feasible context scenarios are determined. In step 160 feasible context scenarios are ranked. In step 170 search results for the highest ranked context scenarios are displayed. In step 180 method 100 ends.

Computer System Implementation

Figure 2:
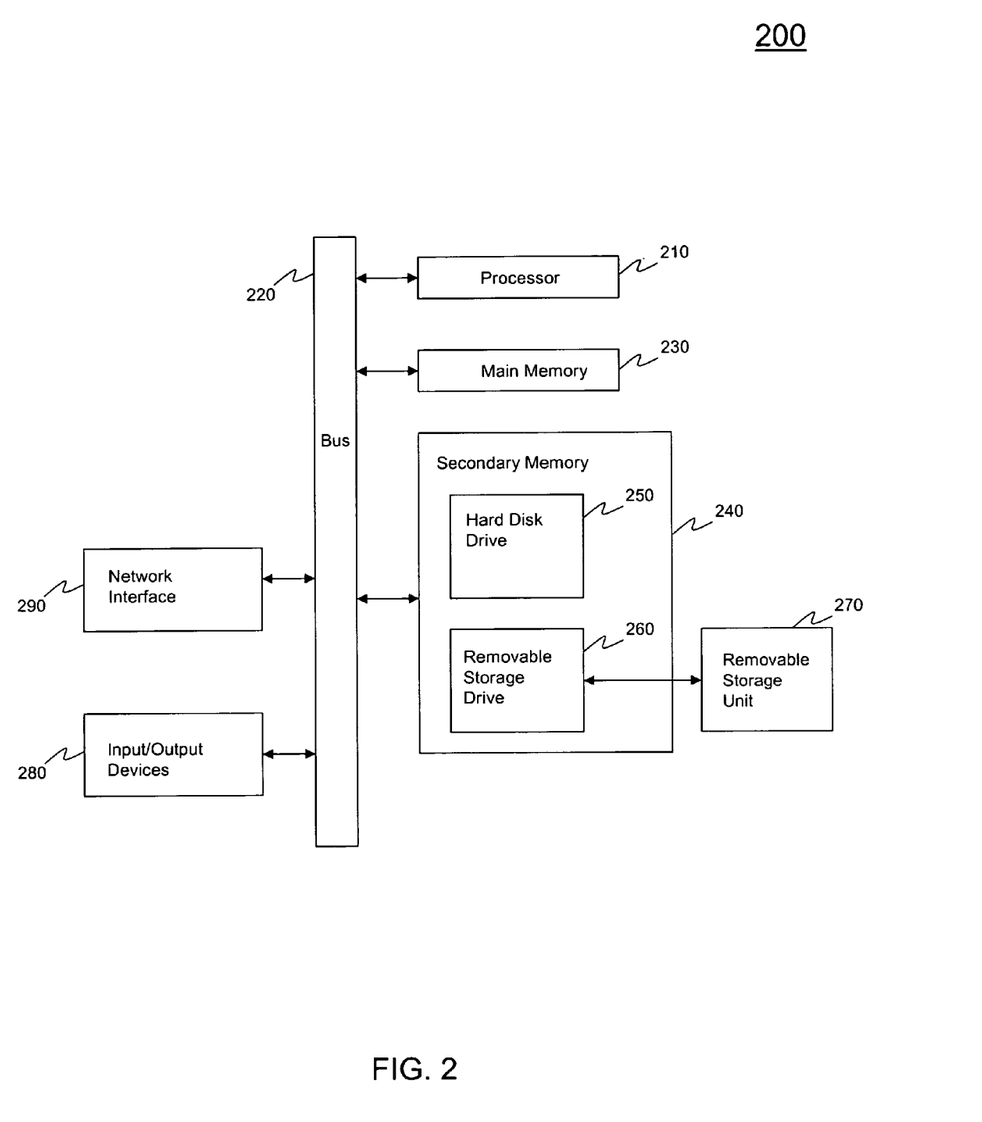
FIG. 2 provides a diagram of a computer implementation for the present invention.

In an embodiment of the present invention, the methods and systems of the present invention described herein are implemented using well known computers, such as a computer 200 shown in FIG. 2. The computer 200 can be any commercially available and well known computer or server capable of performing the functions described herein, such as computers available from International Business Machines, Apple, Sun, HP, Dell, Cray, etc.

Computer 200 includes one or more processors (also called central processing units, or CPUs), such as processor 210. Processor 200 is connected to communication bus 220. Computer 200 also includes a main or primary memory 230, preferably random access memory (RAM). Primary memory 230 has stored therein control logic (computer software), and data.

Computer 200 may also include one or more secondary storage devices 240. Secondary storage devices 240 include, for example, hard disk drive 250 and/or removable storage device or drive 260. Removable storage drive 260 represents a floppy disk drive, a magnetic tape drive, a compact disk drive, an optical storage device, tape backup, ZIP drive, JAZZ drive, etc. Thus, the computer 200 may include at least one computer readable memory medium.

Removable storage drive 260 interacts with removable storage unit 270. As will be appreciated, removable storage unit 260 includes a computer usable or readable storage medium having stored therein computer software (control logic) and/or data. Removable storage drive 260 reads from and/or writes to the removable storage unit 270 in a well known manner.

Removable storage unit 270, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having ing software that enables computer 200, or multiple computer 200s to perform any combination of the functions described herein.

Computer programs (also called computer control logic) are stored in main memory 230 and/or the secondary storage devices 240. Such computer programs, when executed, direct computer 200 to perform the functions of the present invention as discussed herein. In particular, the computer programs, when executed, enable processor 210 to perform the functions of the present invention. Accordingly, such computer programs represent controllers of the computer 200.

Computer 200 also includes input/output/display devices 280, such as monitors, keyboards, pointing devices, etc.

Computer 200 further includes a communication or network interface 290. Network interface 290 enables computer 200 to communicate with remote devices. For example, network interface 290 allows computer 200 to communicate over communication networks, such as LANs, WANs, the Internet, etc. Network interface 290 may interface with remote sites or networks via wired or wireless connections. Computer 200 receives data and/or computer programs via network interface 290. The electrical/magnetic signals having contained therein data and/or computer programs received or transmitted by the computer 200 via interface 290 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A computer implemented method for providing search results for display, comprising:
   receiving a search constraint having a plurality of unique words;
   determining at least one context for each unique word, at least one unique word having more than one context;
   establishing a plurality of context scenarios wherein each context scenario is based upon personal characteristics of a user entering the search constraint, each context scenario comprising each of the unique words correlated with a respective context, at least one context correlated to one of the unique words in a first context scenario being different than another context correlated to the same unique word in the other of the context scenarios;
   ranking the context scenarios;
   receiving a user selection of a search result; and
   updating a knowledge base for the user that is used to rank relevancy of context scenarios based on the user selection of the search result.

2. The computer implemented method of claim 1, further comprising generating search results for the unique words within the search constraint.

3. The computer implemented method of claim 1, further comprising determining semantic variations for each unique word within the search constraint.

4. The computer implemented method of claim 1, further comprising eliminating stop words from the search constraint.

5. The computer implemented method of claim 1, wherein establishing context scenarios includes eliminating context scenarios that are not logically feasible.

6. The computer implemented method of claim 1, wherein ranking the context scenarios includes ranking context scenarios highest when the context scenario comprises one or more contexts that correlate to previous searches of the user.

7. The computer implemented method of claim 1, wherein ranking the context scenarios includes ranking a context scenario highest when the context scenario comprises one or more contexts that correlate to interests of the user.

8. A computer implemented method for providing search results for display, comprising:
   receiving a search constraint;
   determining a plurality of topics within the search constraint;
   determining at least one context for each topic, at least one topic having more than one context;
   establishing a plurality of context scenarios wherein each context scenario is based upon personal characteristics of a user entering the search constraint, each context scenario comprising each topic and a corresponding context, wherein a first context scenario comprises a first topic and a corresponding first context, and a second topic and a corresponding second context, and wherein a second context scenario comprises the first topic and a corresponding third context, and the second topic and the second context, the third context being different from the first context;
   ranking the context scenarios;
   sending search results for the highest ranked context scenario;
   receiving a user selection of a search result; and
   updating a knowledge base for the user that is used to rank relevancy of context scenarios based on the user selection of the search result.

9. The computer implemented method of claim 8, further comprising generating search results for the topics within the search constraint.

10. The computer implemented method of claim 8, wherein receiving a search constraint comprises receiving a search constraint including a plurality of unique words, and further comprising determining semantic variations for each unique word and topic within the search constraint.

11. The computer implemented method of claim 8, further comprising eliminating stop words from the search constraint.

12. The computer implemented method of claim 8, wherein establishing context scenarios includes eliminating context scenarios that are not logically feasible.

13. The computer implemented method of claim 8, wherein ranking the context scenarios includes ranking context scenarios highest when the context scenario comprises one or more contexts that correlate to previous searches of the user.

14. The computer implemented method of claim 8, wherein ranking the context scenarios includes ranking a context scenario highest when the context scenario comprises one or more contexts that correlate to the interests of the user.

15. A computer readable medium storing program instructions that if executed by an apparatus, cause the apparatus to perform operations comprising:
   receiving a search constraint having a plurality of unique words;
   determining at least one context for each unique word, at least one unique word having more than one context;
   establishing a plurality of context scenarios wherein each context scenario is based upon personal characteristics of a user entering the search constraint, each context scenario comprising each unique word and a corresponding context, wherein a first context scenario comprises a first unique word and a corresponding first context, and a second unique word and a corresponding second context, and wherein a second context scenario comprises the first unique word and a corresponding third context, and the second unique word and the second context, the third context being different from the first context;
   ranking the context scenarios;
   receiving a user selection of a search result; and
   updating a knowledge base for the user that is used to rank relevancy of context scenarios based on the user selection of the search result.

16. A system for providing search results, comprising:
   a processor; and
   a memory medium coupled to the processor, wherein the memory medium stores program instructions executable by the processor to perform the steps of:
   receiving a search constraint having a plurality of unique words;
   determining at least one context for each unique word, at least one unique word having more than one context;
   establishing a plurality of context scenarios wherein each context scenario is based upon personal characteristics of a user entering the search constraint, each context scenario comprising each unique word and a corresponding context, wherein a first context scenario comprises a first unique word and a corresponding, first context, and a second unique word and a corresponding second context, and wherein a second context scenario comprises the first unique word and a corresponding third context, and the second unique word and the second context, the third context being different from the first context;

rank the context scenarios;

send search results for the highest ranked context scenario;

receiving a user selection of a search result; and updating a knowledge base for the user that is used to rank relevancy of context scenarios based on the user selection of the search result.

17. A computer-readable memory storing program instructions that, if executed by an apparatus, cause the apparatus to perform operations, comprising:

receiving a search constraint;

determining a plurality of topics within the search constraint;

determining at least one context for each topic, at least one topic having more than one context;

establishing a plurality of context scenarios wherein each context scenario is based upon personal characteristics of a user entering the search constraint, each context scenario comprising each of the topics correlated with a respective context, at least one context correlated to one of the topics in a first context scenario being different than another context correlated to the same topic in the other of the context scenarios;

ranking the context scenarios;

sending search results for the highest ranked context scenario;

receiving a user selection of a search result; and updating a knowledge base for the user that is used to rank relevancy of context scenarios based on the user selection of the search result.

* * * * *